Jan. 17, 1939.  E. L. HARDER  2,144,494

CARRIER CURRENT RELAYING

Filed Dec. 1, 1937  2 Sheets—Sheet 2

INVENTOR
Edwin L. Harder
BY O.B.Buchanan
ATTORNEY

Patented Jan. 17, 1939

2,144,494

UNITED STATES PATENT OFFICE 2,144,494

CARRIER CURRENT RELAYING

Edwin L. Harder, Forest Hills, Pa., assignor to Westinghouse Electric & Manufacturing Company, East Pittsburgh, Pa., a corporation of Pennsylvania Application December 1, 1937, Serial No. 177,560

10 Claims. (Cl. 175—294)

My present invention is an improvement over the pilot protective systems which are described and claimed in a copending application Serial No. 110,660, filed November 13, 1936, by Bernard E. Lenehan, William A. Lewis and myself.

An object of my invention is to provide improved means for obtaining out-of-synchronism protection for preventing tripping as a result of an out-of-step condition of the transmission system, while permitting tripping for faults occurring during the out-of-synchronism condition.

A further object of my invention is to provide a pilot-channel protection system in which carrier current or other pilot-channel current, is transmitted in response to an instantaneous ground relay which is separate from, and more sensitive than, an instantaneous ground relay which is utilized for closing a contact in the tripping circuit, in series with contacts of a ground directional element and a receiver-relay, respectively.

Figure 1:
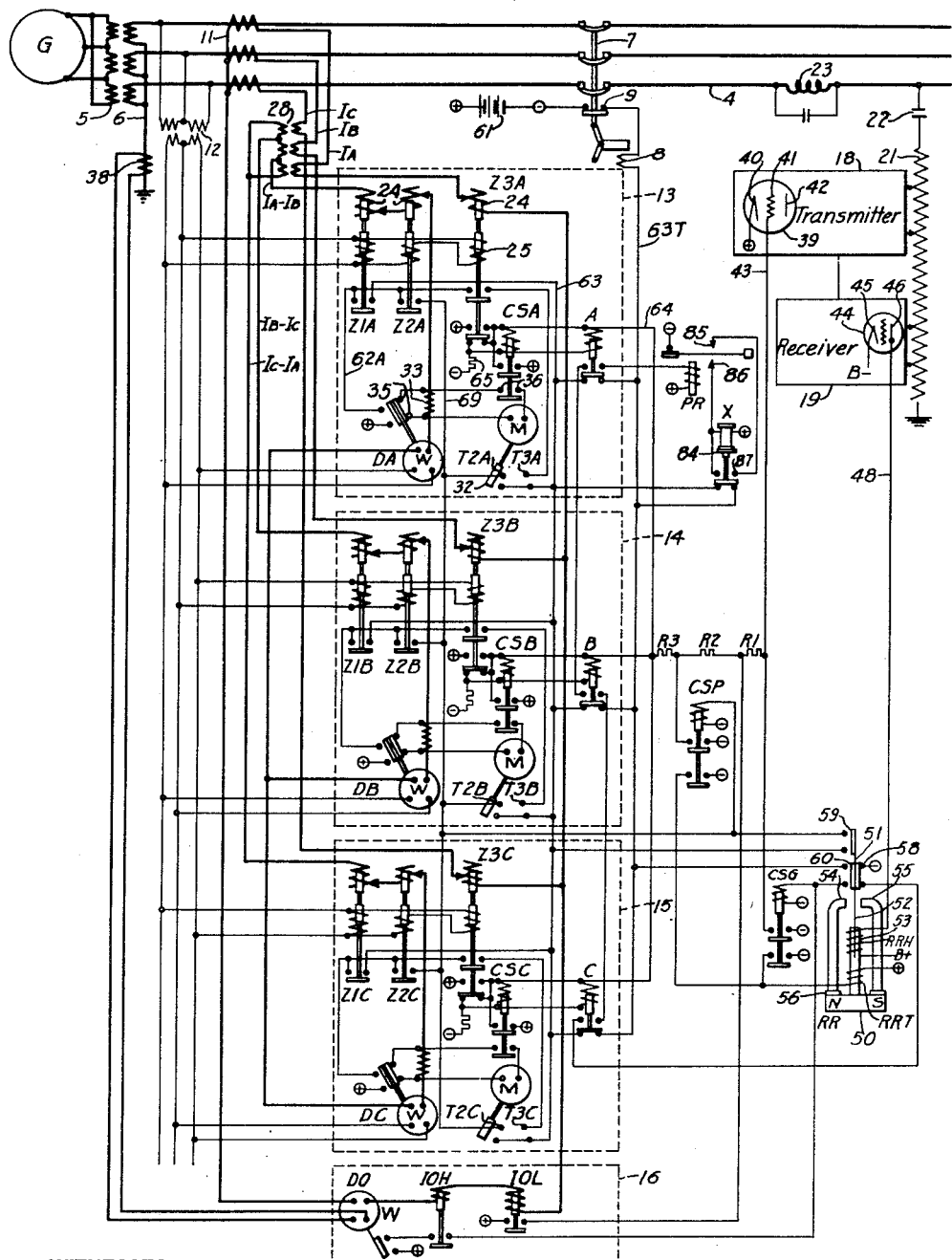
Figure 2:
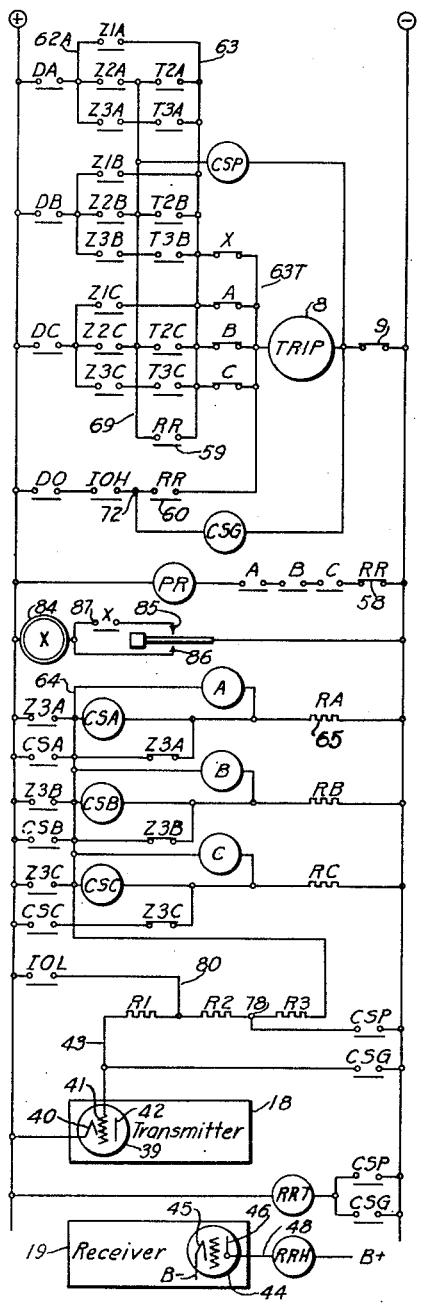

With the foregoing and other objects in view, my invention consists in the circuits, apparatus, systems, combinations and methods hereinafter described and claimed, and illustrated in the accompanying drawings, wherein:

Figure 1 is a simplified diagrammatic view of circuits and apparatus embodying my invention in one preferred form of embodiment, features which are unnecessary to an understanding of my invention being omitted for the sake of clearness, and Fig. 2 is a so-called "across the line" diagram of the direct-current connections of the same relaying system as that shown in Fig. 1, except that the CSP and CSG relay-coils are connected to the negative terminal (—) through the auxiliary contact 9 of the circuit-breaker, which is a preferred connection.

As shown in Fig. 1, my invention is illustrated as being applied to the protection of one end of a protected line-section 4 of a three-phase transmission line, only one end of the protected section being illustrated, as the other end may be similar thereto, in its relaying equipment. The protected line-section 4 is energized from a power transformer bank 5, the secondary side of which is grounded as indicated at 6, and the primary side of which is energized by a synchronous dynamo-electric machine or generator G. It will be understood that other circuits or lines, similar to the line-section 4, and other loads or sources, will in general be connected to the illustrated end of the line-section, the simplest possible connections being illustrated for the sake of clearness.

Each end of the protected line-section 4 is provided with a line-sectionalizing circuit-interrupter 7 which may be an oil circuit-breaker provided with a trip-coil 8 and having auxiliary contacts 9 which are closed when the circuit-interrupter or breaker is closed.

My protective system for controlling the tripping of the circuit breaker 7 utilizes both line-frequency relays and a carrier-current system or other pilot-channel system for transmitting, and responding to, relaying signals to and from the other end of the protected line-section.

The line-frequency relays are illustrated as being energized from a group of line-current transformers 11 and potential transformers 12, and are arranged essentially in four panels 13, 14, 15 and 16, the first three of which are phase-to-phase relays and the last of which is composed of ground protective relays. In addition, I utilize certain auxiliary relaying equipment which will be subsequently described.

The carrier-current equipment for the end of the line-section illustrated in Fig. 1 comprises a carrier-current transmitter 18 and a carrier-current receiver-relay 19, both tuned to the same high or carrier-current frequency, and both coupled to the protected line-section by means of a coupling transformer 21 and a coupling capacitor 22. In addition, it is necessary to provide a resonant carrier-frequency choke coil or wave-trap 23 in the line-wire to which the carrier is coupled, as indicated, and it is necessary to have a receiver-relay, marked RR, which responds to the receipt of suitable carrier-currents or signals.

The phase-fault line-frequency relaying equipments 13, 14 and 15 are all alike except that they are connected to be responsive to different phases of the transmission line, as indicated by the distinguishing subscripts A, B and C in the symbols designating the various relay-elements, so that a description of the relay elements comprising the group 13 will suffice also for the groups 14 and 15.

The relay panel 13 utilizes three so-called "instantaneous" impedance relays which are set to respond to different distances or zones known as zones 1, 2 and 3, as indicated by the symbols Z1A, Z2A and Z3A, the letter "A" indicating the phase in which the relay is connected. The balance-point of the first impedance element Z1A is necessarily within the length of the protected line-section, and is as close to the far end of the same as it is possible to make it without running the risk of a response to any fault-conditions which are further than the far end of the protected line-section. The second impedance element Z2A has its balance-point somewhere beyond the far end of the protected line-section and usually, but not necessarily, in the next section beyond. The third impedance element Z3A is still more sensitive, being set to respond to faults which are still more remote. Each of these impedance elements is provided with a current-responsive actuating coil 24 tending to actuate the relay, and a voltage-responsive restraining coil 25 tending to restrain the operation of the relay.

The impedance relays Z1A and Z2A are shown as having their current coils 24 energized by the delta current, for the accurate measurement of impedance, as set forth in Goldsborough Patent No. 1,877,454 granted September 13, 1932 and in Lewis and Evans Patent No. 2,044,174, granted June 16, 1936. This delta current is in reality the difference between the line-currents in two of the phases of the protected section 4, said difference being obtained by means of auxiliary current-transformers 28.

In accordance with my present invention, the impedance relay Z3A has its current coil 24 energized in response to the line-current in phase A, as distinguished from being responsive to a delta current, because the three third-zone impedance elements Z3A, Z3B and Z3C are utilized to control certain auxiliary relays A, B and C which, in turn, control the out-of-step mechanism when all three of the third-zone impedance elements are operated, as will be subsequently described. If these Z3 elements were responsive to delta current, a line-to-line fault between any two of the lines would or might operate all three of the third-zone impedance elements Z3A, Z3B and Z3C, thus creating a possibility of giving an out-of-step indication erroneously (for an external single line-to-line fault). By operating the current coils 24 of these Z3 relays in response to line-currents, this objection is avoided. The current coil 24 of the impedance relay Z3A, for example, is shown as being energized directly from the corresponding line-current transformer 11, rather than by the auxiliary current-transformers 28. This has the added advantage of relieving the burden on the auxiliary current-transformers 28.

The voltage coils 25 of all three of the impedance relays Z1A, Z2A and Z3A are energized by the phase-to-phase line-voltages, in the same phases to which the current coils of relays Z1A and Z2A respond, the voltage-coil potential being supplied by the potential transformer 12.

The relay panel 13 also comprises a so-called "instantaneous" directional element DA which is designated schematically as a wattmeter indicated by the letter W; a timing element which is designated schematically as a motor M, a movable arm 32 of which makes the successive contacts T2A and T3A for cooperating with the second and third-zone impedance elements Z2A and Z3A respectively; an auxiliary relay or contactor-switch CSA; and also the previously mentioned auxiliary relay A for use in out-of-synchronism control.

The current-coil of the directional element DA is necessarily energized in response to the same current which actuates the second-zone impedance element Z2A, this being necessary in order to prevent faulty operation of my relaying equipment as will subsequently be explained.

The timer motor M is energized by any suitable means such as an auxiliary current-transformer 33 which is connected in series with any of the current coils 24 of this panel 13. In a preferred form of embodiment, the current-transformer 33 is normally short-circuited by means of back-contacts 35 on the directional element DA. The timer motor M is connected to the current-transformer 33 by means of one of two sets of front or "make" contacts 36 of the auxiliary relay CSA. Thus the timing motor M is energized only when the auxiliary relay CSA is energized and when, at the same time, the directional element DA is actuated. The directional element is connected so as to respond only when there is a line-frequency current-flow in an "internal" direction, that is, from the transformer 5 into the protected line-section 4.

The ground-relay panel 16 comprises two so-called "instantaneous" ground-overcurrent relays IOH and IOL which are energized from the neutral of the line-current transformers 11. These relays are of different sensitivities, the first one being a high-current relay, as indicated by the letter H, and the second one being a more sensitive low-current relay, as indicated by the letter L.

The ground-relay panel 16 also comprises a so-called "instantaneous" ground directional element DO which is illustrated as being a wattmeter designated by the letter W, the current coil of this wattmetrical element being energized from the residual line-current in series with the coils IOH and IOL, and the voltage coil of said wattmetrical element being energized by residual voltage or by residual current obtained by a current transformer 38 in the ground-connection 6 of the power-transformer bank 5. The connections for the directional element DO are such that this relay element responds only for an "internal" direction, that is, when the direction of the ground current is such as to indicate that the ground fault is on the same side of the power transformer 5 as the protected line-section 4.

The carrier-current transmitter 18 is illustrated as being of a type having a master-oscillator tube 39 which is shown as being a triode comprising a cathode 40, a grid 41, and a plate or anode 42. The oscillator-tube 39 is of such a type that the oscillations are blocked when a predetermined negative bias is applied to the grid 41 through the grid-control circuit 43, the cathode 40 being permanently connected to the positive station-battery terminal (+).

My receiver 19 is illustrated as comprising, inter alia, a receiver tube 44, having a cathode 45 which is connected to the negative terminal B— of the "B" battery, and having a plate 46 which is connected to the plate-circuit or output-circuit 48 of the receiver.

My receiver-relay RR is of special construction, an improved form of which is described and claimed in an application of B. E. Lenehan and A. W. Rogers, Serial No. 114,964, filed December 9, 1936. Some of the most essential features of the receiver-relay are indicated in Fig. 1 of my drawings, from which it will be seen that the relay is of the polarized type, having a permanent magnet 50 at its base. The relay has a movable armature 51 of soft iron, which is pivoted by means of a spring-portion 52, which is connected to a central core 53 extending from the mid-point of the permanent magnet 50. Two special pole-pieces 54 and 55 are provided for carrying the magnetic flux from the terminals of the permanent magnet 50 to the front and back sides, respectively, of the armature 51, the pole-pieces 54 and 55 being preferably slightly separated, magnetically, from the ends of the permanent magnet 50 by means of shims or spacers 56 of brass or other non-magnetic material.

The central core 53 of the receiver-relay RR is provided with two coils, namely a trip coil marked RRT and a blocking or holding coil marked RRH. The trip coil RRT is adapted to be energized in such direction as to produce an operating force tending to move the armature 51 away from a back-contact 58, so as to make two sets of front-contacts 59 and 60. The blocking coil RRH is more powerful than the tripping coil RRT and is designed to be energized in such direction that it will tend to hold the armature back against its back-contact 58. In addition to these two forces, the receiver relay also has a continuously operative biasing torque which is provided, partly by the spring pivotal connection 52, and partly by an off-center mounting of the movable armature 51 between the faces of the two pole-pieces 54 and 55, so that the armature is normally a little bit nearer to the back pole-piece 55, thereby developing a magnetic force tending to hold the armature 51 against its back-contact 58 as a result of the magnetism of the permanent magnet 50.

The operating connections of the various parts of my system are shown in both Figs. 1 and 2, and may perhaps best be followed with reference to Fig. 2, although the connections may be traced in either figure. The station battery is indicated only in Fig. 1, near the circuit-breaker 7, where it is designated by the numeral 61. It is provided with a positive terminal (+) and a negative terminal (−), and it is indicated in Fig. 2 only by means of its two terminals (+) and (−) respectively.

Starting at the top of Fig. 2, it will be noted that the directional element DA is provided with a make-contact which establishes a partial circuit from the positive terminal (+) to a phase-directional bus 62A. Connected to the phase-directional bus 62A is one terminal of a make-contact carried by the first impedance element Z1A, the other terminal of which is connected to an auxiliary tripping bus 63. Following down along the auxiliary tripping bus 63, in Fig. 2, it will be noted that this bus is connected, through the four parallel-connected back-contacts of out-of-step relays X, A, B and C, as subsequently described, to the tripping bus 63T and to the trip-coil 8 of the circuit breaker, and thence through the auxiliary circuit-breaker contact 9, to the negative bus (−).

Before proceeding further with the next contacts shown at the top of Fig. 2, it is necessary to refer further down in the figure where it is seen that the operating coil of the auxiliary relay CSA is connected between a so-called phase-fault carrier-starting bus 64 and the negative terminal (−), through a resistor 65, also designated RA in Fig. 2 in order to distinguish this resistor from the corresponding resistors RB and RC in the other phases.

The phase-fault carrier-starting bus 64 is energized from the positive terminal (+) by means of the closure of normally open or "make" contacts of any one of the three third-zone phase-fault impedance-elements Z3A, Z3B or Z3C. The operating coils of the relays A and CSA are connected in parallel to each other, and are normally short-circuited by a back-contact of the third-zone impedance element Z3A. These operating coils of the relays A and CSA are connected, on one side, through the resistor RA, to the negative bus (−), and are connected, on the other side, to the phase-fault carrier-control bus 64. The phase-fault carrier-starting bus 64 is energized by the response of any one of the three third-zone impedance-elements Z3A, Z3B or Z3C, this energization of the bus being promptly and directly effected by the closure of the front contact of the actuated element Z3A, Z3B or Z3C, and this front contact, which initially energizes said bus 64, will be immediately by-passed by a make-contact of the corresponding auxiliary contactor-switch or relay CSA, CSB or CSC as the case may be. The operating coil of the CSA relay (for example) is normally shunted by a closed back-contact of the Z3A relay, so that this CSA relay cannot operate unless its particular associated Z3A relay responds to faults on the transmission system.

Referring, now, to Fig. 1, it will be seen that the CSA relay, through its make-contacts 36, controls the energization of the timer motor M which is associated with the timer contacts T2A and T3A. The starting of the timer motor M is dependent, also, upon a response of the "internal" directional element DA, which response is necessary in order to remove the short-circuit at the back contacts 35 of the directional element. It will be seen, therefore, that as soon as the third impedance element Z3A and the directional element DA respond, the auxiliary relay CSA is energized, starting the timer motor M which in predetermined times, first closes its timer contact T2A, and, later on, its timer contact T3A.

Referring again to the top portion of the across-the-line diagram in Fig. 2, it will be seen that there is a second energizing circuit for the auxiliary tripping bus 63 from the phase-directional bus 62A through the front contact of the second impedance element Z2A and thence through the timer contact T2A. The purpose of this energizing circuit is to provide for what is known as sequential tripping in the event that the carrier-current system is not utilized or is out of operation; that is, if there is a fault on the protected line-section very close to the far end of the line-section, so that the first impedance element Z1A will not respond, the fault will not be cleared at the relaying station under consideration until the elapse of a certain time determined by the T2A contact, which will provide ample time for the fault to be cleared by the instantaneous tripping element Z1A at the beginning of the next adjacent line-section (not shown) if it should be that the fault was just beyond the end of the line-section 4 rather than just before the end of the line-section 4. Meanwhile, the fault is instantaneously cleared at the far end of the protected line-section by the Z1A tripping contact at that end, thereby resulting in the sequential tripping of the fault, first at the end which is closest to the fault, and second at the end where the fault is so far away that the first-zone impedance relay element cannot discriminate between faults lying in the very extreme end of the line-section and faults occurring in the beginning of the next adjacent line-section beyond the section which is being protected.

The partial tripping circuits which may be traced through the directional and impedance contacts DA and Z2A in each of the three single-phase, phase-fault-responsive relaying elements, that is, including the partial tripping circuits provided by the make contacts of DB—Z2B and DC—Z2C, are bussed together by means of a phase-fault bus 69 which is thus energized whenever there is a phase-to-phase fault across any two of the line conductors of the line-section 4, close enough to energize the second impedance element of the corresponding line-frequency phase-relays, if, at the same time, the fault-current is in the "internal" direction, so as to pick up the corresponding directional element DA, DB or DC in that particular phase.

As is previously known in carrier-current protective systems, and as shown in Figs. 1 and 2, I utilize a make-contact 59 of my receiver-relay RR to directly connect the phase-fault bus 69 with the auxiliary tripping bus 63 under the control of carrier, so that the carrier-current protection may be utilized to disciminate between the faults which are just beyond the end of the protected line-section and faults which are just within the end of the protected line-section, so as to eliminate the timing element provided by the T2 timing contacts in the three-phase-relaying panels.

Fig. 2 also shows a back-up energizing circuit for the auxiliary tripping bus 63, through the make-contacts of the third-zone impedance element Z3A and the long-time contacts T3A which eventually complete a circuit directly from the phase-directional bus 62A to the auxiliary tripping bus 63, thus providing back-up protection in the event that the fault is not properly cleared by relays at other stations which are closer to the fault before the elapse of the time-setting of the T3A contacts.

It will be understood that the foregoing description, which is mainly directed to the line-frequency phase-fault relay-panel 13, is equally applicable to the other two phase-panels 14 and 15, with a change of subscript to designate the B or C phases rather than the A phase.

According to my invention, I provide a novel form of ground-fault protection comprising separate ground-fault tripping and carrier-starting relays IOH and IOL, respectively, the latter being the more sensitive, that is, picking up at a lower value of the neutral or residual current. For simplicity of illustration, I have shown only the pilot-supervised ground-fault tripping circuit including the "make" contacts of the ground directional relay DO and the high-current ground relay IOH, which together energize an intermediate bus 72, which is in turn connected, by the "make" contacts 60 of the receiver-relay RR, directly to the tripping bus 63T which is connected to the trip-coil 8. This direct tripping-bus connection thus bypasses the back-contacts of the out-of-step relays X, A, B and C, so that the ground-fault tripping is not at all affected by the out-of-step protective apparatus.

According to my invention, I provide a novel form of grid-bias control for starting the carrier-current transmitter 18 in such a manner that the fault-detectors for starting the carrier-current transmission are separate from the fault-detectors which cause tipping under carrier-current control, that is, separate from the fault-detectors which have tripping contacts in series with the receiver-relay contacts 59 and 60; and these carrier-starting fault-detectors are set for a lower operating value than the aforesaid carrier-supervised tripping-circuit fault-detectors, for both phase and ground faults. This, the phase-fault carrier-starting bus 64 is energized by a response of any one of the third-zone impedance relays Z3A, Z3B or Z3C, which are more sensitive than the corresponding carrier-supervised trip-circuit second-zone impedance relays Z2A, Z2B and Z2C which energize the phase-fault bus 69 in the tripping circuit. In like manner, the carrier-starting low-current ground-fault relay IOL is more sensitive than the carrier-supervised trip-circuit high-current ground-fault relay IOH which energizes the intermediate bus 72 in the tripping circuit. This precaution is for the purpose of insuring that the carrier-starting element or relay at one end of the potected line-section always functions at the same time as, or prior to, the operation of the trip-circuit fault-responding element at the other end of the line-section. This precautionary measure must be provided for ground faults as well as for phase faults.

It is frequently necessary to provide preferential control, which is vested in either the ground-fault relays or the phase-fault relays, (usually the ground-fault relays), in order that the starting and stopping of the carrier signal will be controlled by the preferred relays, regardless of the operation of the other relays. Ground-preference is the most frequently desired in order to prevent possible incorrect indications of the phase-current directional elements as a result of load-currents flowing in a direction opposite to the ground-fault currents on certain types of transmission systems. On the other hand, in some cases it may be desirable to give the phase-relays preference over the ground-relays, or to have no preference at all. Usually, however, ground-preference is desired, in order to properly relay in response to single-phase ground-faults, notwithstanding the fact that this ground preference would block the carrier-controlling function of the phase-relays in case of a double-line-to-ground fault, or simultaneous ground-faults at two different locations in a protected line-section.

In the illustrated embodiment of my invention, I show a particular form of preferential action, of whichever kind is desired, usually ground-preference, in an improved manner which does not necessitate the utilization of a separate ground-preference relay for this purpose as described and claimed in a concurrently filed application of Bernard E. Lenehan, Serial No. 177,475.

Thus referring to the lower portion of Fig. 2, it will be noted that the transmitter-grid 41 is controlled by means of three serially connected resistors R1, R2 and R3, the resistor R1 being closest to the grid. The third resistor R3 is normally connected to the negative bus (—) through the phase-fault carrier-control bus 64 and the three parallel-connected resistors RA, RB and RC, thus making the grid negative.

The transmitter grid 41 is thus negatively biased, so as to block transmission, in the normal state of affairs, that is, when there is no fault on the transmission line.

In the event of a phase-fault on the transmission system, one or more of the sensitive phase-fault impedance relays Z3A, Z3B or Z3C will pick up and make a connection between the positive bus (+) and the phase-fault carrier-starting bus 64, thus making the grid-control resistor R3 positive instead of negative, initiating carrier-current transmission by the transmitter 18. If this phase-fault is accompanied by fault-current direction into the protected line-section at the illustrated end of said line-section, and if the fault is within the reach of the second-zone impedance-elements Z2A, Z2B and Z2C, the corresponding second-zone impedance element or elements Z2A, Z2B or Z2C will pick up, as will also the corresponding phase-directional element or elements DA, DB or DC, thus energizing the phase-fault bus 69, which in turn energizes the operating coil of an auxiliary phase-fault contactor-switch or relay CSP, the other terminal of which is connected to the negative bus (—) through the auxiliary contact 9 of the circuit breaker. This CSP relay picks up quickly and closes its "make" contacts, one of which is connected between the negative bus (—) and the junction 78 between the resistors R2 and R3. This causes the resistor R2 to become negative again, thereby applying a negative bias to the transmitter grid 41 and stopping the transmission of carrier-current.

If a ground-fault occurs on the transmission system, the sensitive carrier-starting ground-fault relay IOL will make a connection between the positive bus (+) and the junction 80 between the resistors R1 and R2, thus making the resistor R1 positive, regardless of the condition of the phase-fault control-points 64 and 78, thus providing ground-fault preference. When the point 80 is made positive, the transmitter grid 41 is positive and carrier-current is transmitted. If the ground-fault is of sufficient intensity to pick up the less sensitive ground-fault relay IOH, which may be regarded as corresponding in scope to the second-zone phase-fault impedance elements Z2A, Z2B and Z2C, and if, at the same time, the direction of the ground-current is such as to indicate that the ground-current is flowing away from the relaying terminal under consideration and into the protected line-section, the ground directional element DO will also pick up, thereby energizing the intermediate bus 72, connecting said bus to the positive terminal (+). I have provided a ground-fault contactor-switch or relay CSG, the operating coil of which is connected between this intermediate bus 72 and the auxiliary breaker-switch or contact 91, which is connected to the negative bus (—). This CSG relay immediately picks up and closes its "make" contacts, one of which is connected between the grid-terminal 43 of the transmitter 18 and the negative bus (—), thus making the grid 41 negative again, and blocking the transmission of carrier, regardless of all other controls on the carrier-current transmitter 18, thus providing again for ground-preference.

As shown at the bottom of Fig. 2, the two coils RRH and RRT of the receiver-relay RR are controlled as follows. The holding or blocking coil RRH is connected between the positive B-battery terminal B+ and the plate circuit 48 of the receiver 19, so that this coil RRH is energized whenever the receiver 19 receives a sufficient amount of carrier-current energy from the transmitter 18 at either end of the protected line-section. The tripping coil RRT of the receiver-relay RR is connected, on one side, to the positive bus (+), and on the other side it may be connected to the negative bus (—) by one of the make-contacts of either of the CSP or CSG relays, which respond to "internal" phase-faults and "internal" ground-faults, respectively. In this way the tripping coil RRT of the receiver-relay is not energized until both an insensitive fault-detector response Z2A, Z2B, Z2C or IOH, and a directional response DA, DB, DC or DO are obtained, which takes longer than a sensitive non-directional fault response Z3 or IOL. The insensitive fault-detectors Z2 and IOH require more current to operate them and thus are not only slower than Z3 and IOL, for any given fault-current, but also sometimes may not operate at all for fault-currents which are just barely sufficient to operate Z3 or IOL. The energization of the tripping coil RRT is still further delayed by the slight operating-time required by the auxiliary relay CSP or CSG, as the case may be. Thus an ample factor of safety is provided, to make sure that the holding coils RRH shall be energized, at both ends of the protected line-section, before either tripping coil RRT can possibly be energized.

It is believed that the operation of my carrier-current or pilot-channel relaying equipment may be obvious from the drawings and from the foregoing description. The receiver relay RR is normally biased to its illustrated position with its back-contact 58 closed and its front-contacts 59 and 60 open. If a fault occurs anywhere within the protected line-section, the first thing that happens will be for the sensitive fault-detector Z3 or IOL, as the case may be, to operate, changing the transmitter grid 41 from a negative bias to a positive potential, and starting the transmission of carrier. This immediately puts carrier on the protected line-section and operates the receiver-relay holding coils RRH at both ends of the line-section, thus insuring that the receiver-relays RR shall remain in their normal non-tripping positions, regardless of whether their operating or tripping coils RRT are energized or not.

If there is a fault within the reach of the second-zone impedance element Z2 or the insensitive ground element IOH, accompanied in either case by an "internal" direction, or direction into the protected line-section, the auxiliary relay CSP or CSG at the terminal where this internal direction occurs will be operated, closing its make-contacts CSP or CSG and energizing the operating or tripping coil RRT of the receiver relay RR at that station. At the same time the same relay CSP or CSG, as the case may be, will change the transmitter grid-bias so as to block transmission of carrier-current at that station. Unless, however, there is a similar "internal" direction registered at the other end or ends of the protected line-section, carrier-current will not be removed from the line-section at said end or ends, so that the receiver-relay holding-coils RRH will remain energized at both or all ends of the line-section, thus preventing the closure of either one of the receiver-relay tripping-contacts 59 or 60. If the direction is "internal" at both or all ends, carrier will be altogether removed from the line-section, the receiver-relay holding-coils RRH will be deenergized, and the receiver-relay tripping-coils RRT will actuate the respective receiver-relays RR to their tripping positions, closing their contacts 59 and 60 in the trip-circuits.

It can be shown that the currents circulating in the wires of a three-phase system during fault-conditions are exactly the superposition of two sets of quantities:

(1) The load-currents flowing prior to the fault, and (2) The currents which would flow were all the electromotive forces of the network set equal to zero and the voltage at the point of fault prior to the fault applied alone in the fault path.

This will show that in the case of a wire-to-wire fault on a balanced three-phase system, the current in the third wire is identically what it was prior to the fault.

When single-phase fault-detector elements are connected in series with single-phase directional elements to provide a tripping combination, or to provide a directional combination, the association of an impedance element of a phase carrying phase-to-phase fault-current or delta current, with a directional element of a phase carrying only load-current or star current, may result in the combination being either closed or open during fault-conditions, depending upon the direction of the load-current prior to the fault.

This has not caused trouble with distance relaying because of two reasons.

(1) For a BC fault, with the A phase carrying load, the conventional arrangement is generally to utilize star current A on the directional element (30-degree connection) and delta current BA on the corresponding impedance element for said phase A. This BA impedance element or fault-detector does not generally respond for a BC fault, because the BA voltage does not collapse sufficiently, and hence a faulty relay-operation is so infrequent, for relays set as distance relays, that star directional and delta impedance current-connections have been standard for years. Where other connections have been used the reason has been to obtain a 60° connection (delta) rather than 30°, because the line-impedance angle was such as to give better directional torques with this connection.

(2) The third-zone impedance elements Z3 which have been set for far faults have heretofore been time-delayed, and hence the faults, if external, have been cleared before the expiration of this time-delay. With carrier-current control it is the second-zone impedance element Z2 which is set for far faults at times. If this Z3 element responds in phase A for a BC fault, when the load-current direction is internal, it stops carrier and instantaneous tripping thus occurs, even though the fault may be external.

With carrier-current relaying, the distance-setting of the second-zone impedance elements Z2 may be many section-lengths in order to secure a high speed of operation for faults within the protected line-section; carrier-current supervision rather than distance-settings being relied upon for selectivity. The voltage-collapse of the BA phase, in the event of a BC fault, is enough to operate the Z2 fault detectors so set. This was first discovered in laboratory tests, then verified analytically. The solution of energizing the distance elements and the corresponding second-zone impedance element from the same current has been verified, both experimentally and theoretically as a satisfactory solution of the above-named difficulty.

A novel feature of my invention relates to improvements in the out-of-step protective mechanism. It is often desirable to prevent the operation of relays during out-of-step conditions as the system may pull back into step; and even if the system does not stabilize itself, it is then desirable to separate the system only at locations where frequency-control for synchronizing is available and where adequate generating capacity is available on each side of the break to supply the load on that side. The carrier signal between the two ends of the line provides a means for preventing tripping during out-of-step conditions, without impairing the ability to trip with reasonable speed for internal faults occurring during out-of-step conditions.

The fundamental difference between a three-phase fault and an out-of-step condition is that a fault reduces the voltages and increases the current quite suddenly, whereas, during the approach of an out-of-step condition, the voltage- and current-changes are comparatively gradual.

For a three-phase fault, the distance-elements or impedance relays Z3 are all operated practically simultaneously, but during out-of-step conditions the most sensitive of the distance-elements Z3 operates first, followed by the other Z3 elements, then Z2, and then Z1. As the system returns toward the in-phase position, near the end an out-of-synchronism cycle, the elements reset in the opposite order, that is, Z1, Z2, Z3.

To prevent tripping during out-of-step, it is only necessary to arrange apparatus for causing the simultaneous closure of the three Z3 relay make-contacts and the receiver-relay back-contact 58 to operate an additional blocking-relay aggregate, X, A, B, C, which functions to open the phase-fault trip-circuit 63—63T. This blocking-relay aggregate X, A, B, C must have a slight time-delay, so that it does not open the phase-fault trip-circuit 63—63T before a tripping relay-operation can occur as a result of a three-phase fault. A time-delay of 3 to 4 cycles (60-cycle basis) has been found satisfactory for this purpose. On the other hand, during an out-of-step condition, when the transmission system approaches its 180° position, near the middle of the out-of-synchronism cycle, the blocking-relay aggregate must open the phase-fault trip-circuit 63—63T before the second element Z2 and the corresponding directional element DA, DB or DC are operated, that is, before. carrier can be removed from the line-section, and before the receiver-relay can close its tripping contact 58.

Referring to either Fig. 1 or Fig. 2, the main out-of-step blocking-relay is indicated at X. It is illustrated as a sluggishly acting relay, with a short-circuited washer 84 for retarding flux-changes therein. In parallel with the back-contact of the blocking relay X are the three back-contacts of the auxiliary relays A, B and C, which are operated by the Z3 contacts of the distance relays. These four back-contacts, X, A, B and C, are between the two busses 63 and 63T in the phase-fault trip-circuit. The three make-contacts of the relays A, B and C are in series with the receiver-relay back-contact 58, and are connected so as to energize the coil of a vibrating or pendulum-type time-delay relay PR having upper, or break, contacts 85, and lower, or make, contacts 86. The front-contacts 86 of the pendulum relay PR directly energize the coil of the blocking relay X, and the back-contacts 85 of the pendulum relay energize the X coil through a "holding" or front-contact 87 of the latter.

Every time that all three of the Z3 carrier-starting contacts close, the relay-coils A, B and C will all be energized. The front-contacts of all three relays A, B and C thus close, and if the receiver-relay back-contact 58 is also closed, these four contacts will energize the relay PR, which will close its front contact 86 and energize the blocking-relay X. The blocking-relay X will slowly build up its magnetic flux, and will open its back-contact, in the phase-fault trip-circuit between the busses 63 and 63T, in about 3 or 4 cycles; the A, B and C back-contacts in said trip-circuit having previously opened as soon as the relays A, B and C were energized.

Thus, if the electrical center of the transmission system is inside the protected line-section, then when the two voltage-sources at the two ends of the line are approximately 180° out of phase, the phase-responsive directional and impedance elements at both ends of the section will all move to, or be in, their actuated positions. This will energize the CSP relays at both ends of the line-section. One of the front CSP contacts at each end of the line-section will apply negative bias to its associated transmitter; and hence carrier-current transmission will be blocked at both ends of the line-section, deenergizing the carrier-responsive holding-coils RRH of both receiver-relays RR. The other front CSP contact at each end of the line will energize the receiver-relay trip-coils RRT from the local batteries, causing both receiver-relays RR to move to actuated or tripping position.

False tripping is avoided, under these circumstances, by the fact that the receiver-relay back-contacts 58, in circuit with the pendulum-relay coil PR, open when the receiver-relays are actuated, thus deenergizing the pendulum relays PR at both ends of the line, and setting these relays in vibration. The trip-blocking back-contacts of the blocking relays X thus do not immediately reset, because of the change-resisting short-circuiting washers 84, and also because the coils of these blocking relays are energized by the alternate closing of the top and bottom contacts 85, 86 of the vibrating pendulum-relays PR. After the amplitude of vibration of the pendulum has decreased to a certain value, it will not strike either of its contacts 85 or 86, and the blocking relay X will then reset. This time-delay of resetting is adjustable and should be longer than the time during which both sets of phase-fault directional elements DA—DB—DC "point in" at the two ends of the line, which time depends upon the length of the "slip-cycle" or out-of-step cycle of the transmission system.

It is desirable to clear internal faults occurring within the protected line-section during an out-of-step condition, but it is not so essential to be able to clear all of such faults at a high speed. The ground-fault trip-circuit 72—60 is not blocked by the out-of-step relay X, and can, of course, trip instantly. On a phase-to-phase fault, one or two of the Z3 contacts will reset when the system swings into phase, near the end of the slip-cycle, thus allowing one or two of the back-contacts A, B or C to complete the phase-fault trip-circuit 63—63T without waiting for the resetting of the blocking relay X. In fact the Z3 elements were purposely energized from star currents to permit one of them to reset on any line-to-line fault which occurs during out-of-step.

On an internal three-phase fault, however, none of the Z3 contacts will reset at the end of the slip-cycle, and consequently, tripping will not occur until after the expiration of the time-delay in the resetting of the PR and X relays. The resettings of the pendulum relay PR, and hence the blocking relay X, are made possible in this case by the opening of the receiver-relay back contact 58, which is brought about as follows. After the three-phase fault occurs, power flows into the line-section from both ends, thus removing carrier from said line-section and permitting the receiver-relay trip-coils RRT to open the receiver-relay back-contacts 58 at both ends of the line-section.

It will be noted, from the diagram, that the back-up phase-fault tripping-circuit through D, Z3 and T3 is connected so as to be blocked by the out-of-step back-contacts X, A, B C. Thus, in the particular embodiment shown, this time-delay back-up protection on three-phase faults is not possible during out-of-step operating conditions. My invention obviously is not limited to this particular connection of the back-up phase-fault tripping-circuit.

While I have illustrated my invention in a single preferred form of embodiment, it is obvious that many changes in details of execution may be made without departing from some of the broader principles of my invention. I desire, therefore, that the appended claims shall be accorded the broadest construction consistent with their language and the prior art.

I claim as my invention:

1. Protective relaying equipment for a polyphase transmission-line, including a signal-current pilot-channel between the ends of a line-section to be protected, and further including, at each of said ends, a circuit-interrupter means and trip-circuit means for actuating said circuit-interrupter means, including a ground-fault-detector relaying means, a ground-fault directional relaying means, a signal-current receiver, and a normally non-transmitting signal-current transmitter, characterized by transmitter-starting means responsive to said fault-detector relaying means, and transmitter-stopping means responsive to said directional relay means, the ground-fault directional relaying means comprising a pair of elements, one being a sensitive ground-fault directional element and the other being a ground-fault detector element, and connections whereby both of the said elements must respond before said ground-fault directional relaying means will indicate a response, said ground-fault detector element being less sensitive than said ground-fault detector relaying means.

2. The invention as defined in claim 1, characterized by a receiver-relay having trip-controlling contacts, means for causing said receiver-relay to be in a non-tripping position during normal fault-free line-conditions, means responsive to a receipt of sufficient signal-current by said receiver for making certain that said receiver-relay remains in its non-tripping position even during line-fault conditions, the signal-current receiver being responsive to the signal-current transmitters at each of said ends of the protected line-section, means responsive to a response of said directional relaying means and a non-receptive condition of said receiver for causing said receiver-relay to move to a tripping position, and means jointly responsive to a tripping position of said receiver-relay and to a response of said directional relaying means for effecting a circuit-interrupting operation of said circuit-interrupter means.

3. Protective relaying equipment for a polyphase transmission-line, including a signal-current pilot-channel between the ends of a line-section to be protected, and further including, at each of said ends, a circuit-interrupter means and trip-circuit means for actuating said circuit-interrupter means, including a phase-fault-detector relaying means, a phase-fault directional relaying means, a ground-fault-detector relaying means, a ground-fault directional relaying means, a signal-current receiver, and a normally non-transmitting signal-current transmitter, characterized by transmitter-starting means responsive to said fault-detector relaying means, and transmitter-stopping means responsive to said directional relaying means, the phase-fault directional relaying means comprising a plurality of pairs of single-phase elements connected in different phases, one of said elements of each pair being a sensitive directional element and the other being a fault-detector element, both responsive to the same currents derived from the line, the ground-fault directional relaying means comprising a pair of elements, one being a sensitive ground-fault directional element and the other being a ground-fault detector element, and connections whereby both of the elements of some pair must respond before the corresponding directional relaying means will indicate a response, each fault-detector element being less sensitive than its associated fault-detector relaying means which starts the signal-current transmitter.

4. The invention as defined in claim 3, characterized by a receiver-relay having trip-controlling contacts, means for causing said receiver-relay to be in a non-tripping position during normal fault-free line-conditions, means responsive to a receipt of sufficient signal-current by said receiver for making certain that said receiver-relay remains in its non-tripping position even during line-fault conditions, the signal-current receiver being responsive to the signal-current transmitters at each of said ends of the protected line-section, means responsive to a response of said directional relaying means and a non-receptive condition of said receiver for causing said receiver-relay to move to a tripping position, and means jointly responsive to a tripping position of said receiver-relay and to a response of said directional relaying means for effecting a circuit-interrupting operation of said circuit-interrupter means.

5. Out-of-step and protective relaying equipment for a polyphase transmission-line, including a signal-current pilot-channel between the ends of a line-section to be protected, and further including, at each of said ends, a circuit-interrupter means and trip-circuit means for actuating said circuit interrupter means, including a phase-fault-detector relaying means, a phase-fault directional relaying means, a signal-current receiver, a receiver-relay responsive to said receiver, and a signal-current transmitter, characterized by transmitter-controlling means responsive to said directional relaying means, said directional relaying means comprising a plurality of pairs of single-phase elements connected in different phases, one of said elements of each pair being a sensitive directional element and the other being a fault-detector element, both responsive to the same phase of currents derived from the line, connections whereby both of the elements of some pair must respond before the directional relaying means will indicate a response, said fault-detector relaying means comprising a plurality of single-phase elements connected in different phases, said elements of the fault-detector relaying means being more sensitive than the fault-detector elements of said directional relaying means, and trip-circuit means utilizing a response of said directional relaying means, a tripping condition of said receiver-relay, and a set of normally closed parallel-connected out-of-step-responsive contacts for quickly actuating said circuit-interrupter means to a circuit-interrupting condition in response to faults occurring within said line-section, said set of normally closed parallel-connected out-of-step-responsive contacts comprising a slowly operating contact and a quickly operating contact-means, means for causing said quickly operating contact-means to open when all of the elements of the fault-detector relaying means are actuated and for causing said quickly operating contact-means to reclose when any of said elements returns to its non-actuated condition, and means for causing said slowly operating contact to open after a short predetermined time-delay in response to a potential out-of-step indication consisting of a simultaneous response of all of the elements of said fault-detector relaying means and a non-tripping position of said receiver-relay and for causing said slowly operating contact to reclose after a much longer predetermined time-delay in response to the termination of said potential out-of-step indication.

6. The invention as defined in claim 5, characterized by the elements of said fault-detector relaying means being responsive to line-currents as distinguished from phase-to-phase delta currents.

7. The invention as defined in claim 5, characterized by the elements of said directional relaying means being responsive to phase-to-phase delta currents.

8. The invention as defined in claim 5, characterized by the elements of said directional relaying means being responsive to phase-to-phase delta currents, the elements of said fault-detector relaying means being responsive to line-currents as distinguished from phase-to-phase delta currents.

9. Out-of-step and protective relaying equipment for a polyphase transmission-line, including a signal-current pilot-channel between the ends of a line-section to be protected, and further including, at each of said ends, a circuit-interrupter means and trip-circuit means for actuating said circuit-interrupter means, including a phase-fault-detector relaying means, a phase-fault directional relaying means, a signal-current receiver, a receiver-relay responsive to said receiver, and a signal-current transmitter, characterized by transmitter-controlling means responsive to said directional relaying means, said directional relaying means comprising a plurality of pairs of single-phase elements connected in different phases, one of said elements of each pair being a sensitive directional element and the other being a fault-detector element, both responsive to the same phase of currents derived from the line, connections whereby both of the elements of some pair must respond before the directional relaying means will indicate a response, said fault-detector relaying means comprising a plurality of single-phase elements connected in different phases, the elements of said fault-detector relaying means being responsive to line-currents as distinguished from phase-to-phase delta currents, said elements of the fault-detector relaying means being more sensitive than the fault-detector elements of said directional relaying means, and trip-circuit means utilizing a response of said directional relaying means, a tripping condition of said receiver-relay, and a normally closed out-of-step-responsive contact-means for quickly actuating said circuit-interrupter means to a circuit-interrupting condition in response to faults occurring within said line-section, and means for utilizing a simultaneous response of all of the elements of said fault-detector relaying means and a non-tripping position of said receiver-relay in a time-delayed control of said normally closed out-of-step-responsive contact-means.

10. The invention as defined in claim 9, characterized by the elements of said directional relaying means being responsive to phase-to-phase delta currents.

EDWIN L. HARDER.